Aug. 28, 1928.
G. D. JONES
1,682,727
COMBINED TRACTOR AND AGRICULTURAL IMPLEMENT
Original Filed March 5, 1921   2 Sheets-Sheet 2
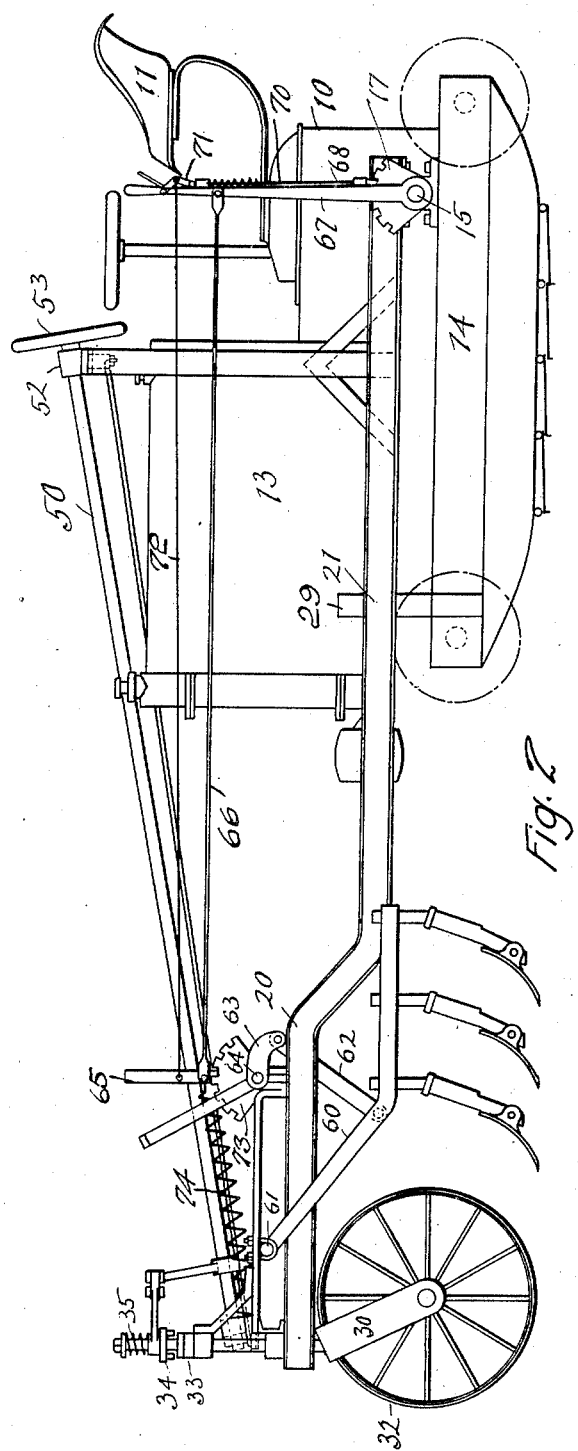
Inventor
George Douglas Jones
By
Attorneys.

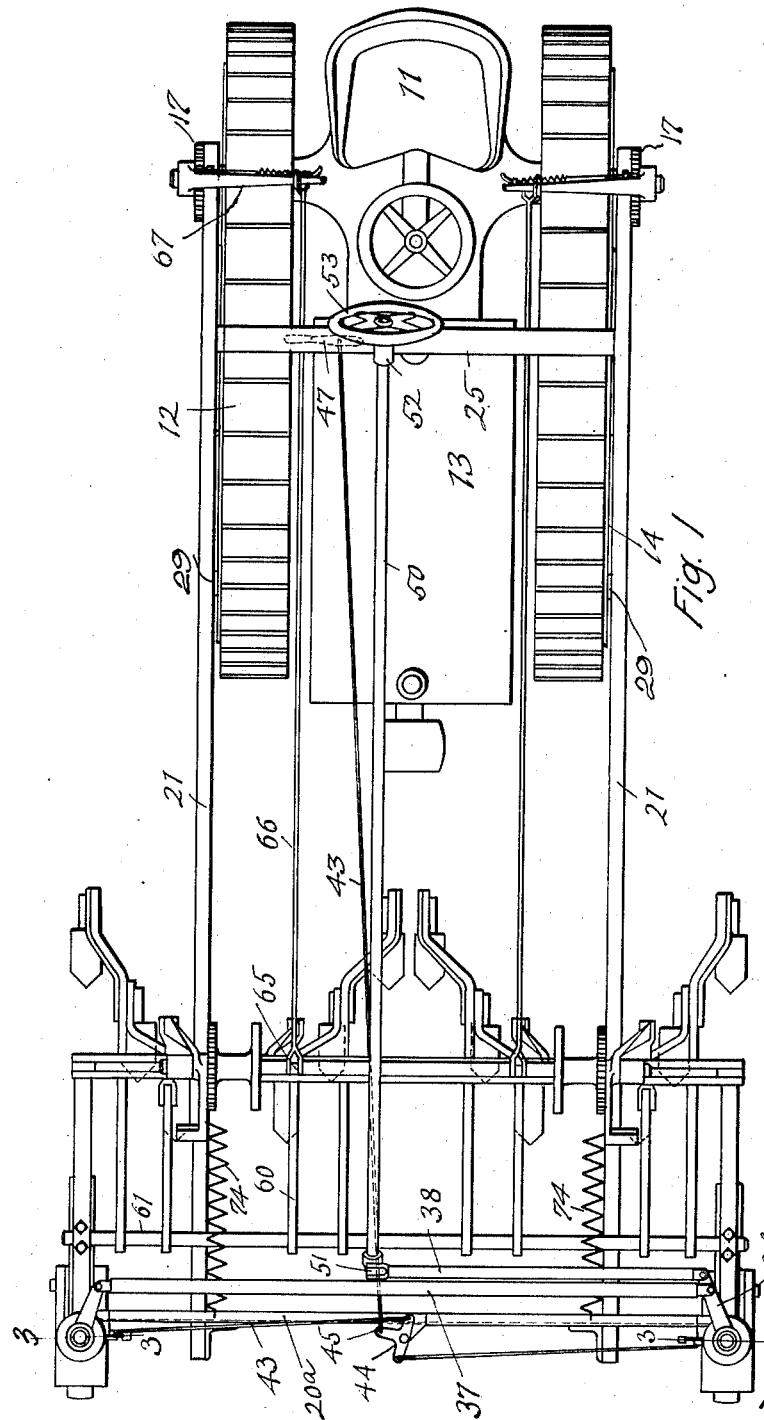

Patented Aug. 28, 1928.

1,682,727

UNITED STATES PATENT OFFICE.

GEORGE DOUGLAS JONES, OF CLEVELAND, OHIO, ASSIGNOR TO THE CLEVELAND TRACTOR COMPANY, OF EUCLID, OHIO, A CORPORATION OF OHIO.

COMBINED TRACTOR AND AGRICULTURAL IMPLEMENT.

Application filed March 5, 1921, Serial No. 449,787. Renewed February 2, 1926.

This invention relates to those combinations of a tractor and agricultural implement wherein the implement is arranged in front of the tractor and is pushed thereby; and the object of the invention is to better adapt the stated combination for operation under the various conditions which arise in practical use.

The invention consists in the construction and combination of parts shown in the drawings and hereinafter described and pointed out definitely in the appended claims.

In the drawings, Fig. 1 is a plan view of the present invention; Fig. 2 is a side elevation thereof; Fig. 3 is a vertical section taken in the plane of either of the lines 3—3 on Fig. 1; Fig. 4 is a sectional plan in the plane of line 4—4 on Fig. 3; Fig. 5 is a sectional plan of the mechanism shown in Fig. 3, taken in the plane of line 5—5 on Fig. 3.

The tractor shown, represented generally by 10, is of the track laying type; and may be of any suitable construction, although it is my present belief that very much better practical results will be attained if the tractor employed is of the sort which is steered by positively driving both track belts but at different rates. Several prior patents, including the White reissue Patent No. 14,938, show tractors which are steered in this manner.

The tractor is provided with some features, which will be described, which are provided for effecting its operative combination with the implement; but the tractor shown is generally like those which are known in that it has a main frame 13, and two endless track structures represented generally by 12, which are disposed in parallel relation on opposite sides of the main frame. Each of these endless track structures includes a track frame 14 which in the construction shown has a pivotal connection near its rear end with the main frame by means of a shaft 15 on which the track frame is hung.

The implement shown is a cultivator which broadly speaking is also old, although it is provided with certain features of construction through which it is operatively connected and combined with the tractor; and it is also provided with means through which the tractor driver on the seat 11 of the tractor may move certain parts of the cultivator as may be required to enable it to perform its functions advantageously.

The implement includes a rigid frame whose side members 21 are spaced apart the proper distance to enable the tractor to go between them. These are of such length that when their rear ends are connected with the tractor the various parts of the implement will occupy a suitable position in advance of the tractor. The rear ends of these frames have a pivotal connection with the tractor, being hung on the same shaft 15 which affords the pivotal connection between the two track frames 14 and the main frame of the tractor. Lateral movement of the implement relative to the tractor must be prevented; and in the construction shown this is accomplished by securing rub plates 29 to the sides of the tractor in such positions that the side frame members will be in sliding engagement with them.

At the front end of the implement, and adjacent each front corner thereof are two vertical sleeves 23, 24, in which the stem 31 of a wheel fork 30 is mounted for rotation about a vertical axis. A wheel 32 is rotatably mounted in each of the forks 30. The front end of the implement frame is supported upon these wheels through said forks.

One member 33 of a jaw clutch is fixed to each stem just above and in engagement with the bearing sleeve 23, whereby this clutch member serves to prevent downward endwise movement of the fork 31 in its bearings. The other member 34 of the jaw clutch loosely embraces this stem 31 above the member 33, whereby it may slide along said stem and is capable of relative rotation. It is under the influence of a spring 35 which acts to move it down and cause the two clutch members to engage each other. If the clutch member 34 is raised out of engagement with clutch member 33, then the stem 31 is left free to rotate in the bearing sleeves 23, 24, whereby the two wheels 32 will have a castor-like action.

Mechanism, operable from the driver's seat 11 is provided for simultaneously raising the two clutch members 34 out of engagement with the clutch members 33. This mechanism consists in specific form shown, of a fork lever 40 associated with each clutch member 34, said lever being pivoted to a bracket 23ª which is a part of the bearing sleeve 23, a link 41, a bell crank lever 42, a transversely extended rod 43. The two rods 43 are pivotally connected with a rocker 44 which is pivoted to the front end of the tractor frame near the middle thereof; and this rocker has an arm 45 which is connected by a rod 46 with a lever 47 located in such relation to the driver's seat 11 that he may operate it. This lever is pivoted to the under side of a cross bar 25 which is rigidly connected with the two side frame members 21; thereby becoming a part of the rigid frame of the implement. The cross bar extends transversely over the main frame. The lever 47 may be associated with a latch for holding it in any position in which it may be moved, but since the provison of latches for such levers is old, it has not been thought necessary to show a latch for the stated purpose.

A lever arm 36 is fixed with each of the sliding clutch members 34 and these two levers are connected together by a cross link 37. A link 38 also connects one of these lever arms 36 with a crank arm 51 secured to the front end of a steering post 50. This steering post has one bearing 52 on the cross bar 25, and another bearing for its front end fixed to the transverse frame member 20ª. When the clutch members 34 are in engagement with the clutch members 36, the turning of the steering post 50, which has a steering wheel 53 secured to its rear end in convenient position for the occupant of the driver's seat 11, will turn both front wheels about the axes of their steering fork stems, whereby said wheels will function as steering wheels for the front end of the implement.

In using this combination of tractor and implement and more especially when the implement is a cultivator or some analogous implement, when the cultivator is being pushed along between rows of growing plants for the purpose of cultivating the soil, it is extremely desirable and practically necessary to allow the front wheels 30 to have a free castoring movement because thereby very slight changes in direction of the tractor will produce almost instantly such lateral motion of the front end of the implement as will allow the implement to be steered so as to avoid cutting the growing plants, because the tractor acting on the implement through the long rearwardly extended frame members thereof, swings the front end of the implement to right or left as the tractor is steered. But there are other conditions of use under which the castor action of the wheels is neither necessary nor desirable. When any such condition arises the operator may cause the operation of the clutches to connect the wheels 32 with the steering mechanism, whereby they will function as steering wheels. This will relieve the implement frame of the tractor from much of the strain which is incident to the use of the combined machine when the wheels 32 function as castors.

As before stated, the means operable by a person sitting on the seat 11 are provided for manipulating the various parts of the implement as may be required for its successful use. These, however, are no parts of the present invention, and therefore it is not thought that any more than a very brief description of them will be necessary.

The hoe carrying beams 60 are all loosely hung on a transverse shaft 61. Each of these beams is supported from the implement frame by a link 62, and an arm 63 which is pivoted to the link and fixed to a rock shaft 64. There are two of these rock shafts, but they are arranged in alignment on opposite sides of the longitudinal center of the machine. A lever arm 65 fixed to each rock shaft is connected by a link 66 with an operating lever 67 located within easy reach of the man on the seat 11. There are, therefore, two levers 67; and associated with each is a segment 17 fixed to the side tractor frame member 14 for engagement by a latch 68 of familiar form carried by the associated lever 67 which lever is loosely mounted on the same shaft 15 through which the side frame member 14 is pivoted to the main frame. The latches 68 are operated by a rod 70, and a bell crank 71 which is pivotally secured to each lever 67. A link 72 extends from each bell crank 71, to a suitable latch operating mechanism associated with the segment 73, which loosely surrounds shafts 64 and are secured to the implement frame. The driver operates the bell crank 71 which engages or disengages the latches associated with the segments 17 and 73 simultaneously. Suitable springs 74 are secured under tension between the lever arms 65 and the front cross bar of the implement frame, which tension thereof tends to rock the shafts 64 in such direction as to raise the cultivator gangs from the ground.

Having described my invention, I claim:

1. The combination of a tractor; an implement carrying frame operatively connected to said tractor and having a pair of supporting casters rotatably connected by spindles therewith; and mechanism for controlling the movement of said casters for steering, said mechanism comprising a clutch element fixed to each of the caster spindles, a clutch element rotatably and slidably mounted on each of said spindles for positively engaging the fixed clutch elements, a single means on said tractor connected with said slidable clutch elements for rotating them in unison, and a single means on said tractor for operating said slidable clutch elements to move them into or out of engagement with said fixed clutch elements.

2. The combination of a tractor, an agricultural implement which is located in front of the tractor and has a rigid frame that near its end is pivoted to the tractor on a transverse horizontal axis, means to prevent lateral movement of the implement frame relative to the tractor, a support for the front end of the implement frame, a fork in which said support is mounted which fork is provided with an upwardly extended vertical spindle, a bearing carried by the implement frame in which said spindle is rotatably mounted, a clutch member fixed to said spindle, a co-operating clutch member which is mounted to slide and to rotate upon said spindle, steering mechanism mounted on the implement frame, operative connections between said steering mechanism and the sliding clutch member, and means operable at will from the driver's seat of the tractor to cause the engagement and disengagement of said clutch members.

3. The combination of a tractor, an agricultural implement which is located in front of the tractor and has a rigid frame that near its rear end is pivoted to the tractor on a transverse horizontal axis, means to prevent lateral movement of the implement frame relative to the tractor, a support for the front end of the implement frame comprising two ground engaging wheels, fork members in which said wheels are respectively mounted,—each fork member having a vertically extended stem, two bearings carried by the implement frame adjacent the front corners thereof in which the two fork stems are rotatably mounted, a clutch member fixed to each fork stem, a clutch member which is slidably and rotatably mounted upon each clutch stem, arms fixed to the two sliding clutch members, a cross link connecting the two arms, a steering shaft mounted on the implement frame, means connecting said steering shaft with one of said clutch members whereby the latter may be turned, and means operable from the driver's seat of the tractor for simultaneously moving the two movable clutch members into and out of engagement with the associated clutch members.

4. The combination of a tractor, an agricultural implement which is located in front of the tractor and has a rigid frame that near its rear end is pivoted to the tractor on a transverse horizontal axis, means to prevent lateral movement of the implement frame relative to the tractor, a support for the front end of the implement frame comprising two ground engaging wheels, fork members in which said wheels are respectively mounted each fork member having a vertically extended stem, two bearings carried by the implement frame adjacent the front corners thereof in which the two fork stems are rotatably mounted, a clutch member fixed to each fork stem, a clutch member which is slidably and rotatably mounted upon each clutch stem, arms fixed to the two sliding clutch members, a cross link connecting the two arms, a steering shaft mounted on the implement frame, means connecting said steering shaft with one of said clutch members whereby the latter may be turned, springs for moving the moving clutch members into engagement with the associated clutch members, two levers which are respectively associated with the movable clutch members for moving them in opposition to their springs out of engagement with the associated clutch members, and means for simultaneously rocking said two levers for the purpose specified.

5. The combination of a tractor, an agricultural implement which is located in front of the tractor and has a rigid frame that near its rear end is pivoted to the tractor on a transverse horizontal axis, means to prevent lateral movement of the implement frame relative to the tractor, a support for the front end of the implement frame comprising two ground engaging wheels, fork members in which said wheels are respectively mounted each fork member having a vertically extended stem, two bearings carried by the implement frame adjacent the front corners thereof in which the two fork stems are rotatably mounted, a clutch member fixed to each fork stem, a clutch member which is slidably and rotatably mounted upon each clutch stem, arms fixed to the two sliding clutch members, a cross link connecting the two arms, a steering shaft mounted on the implement frame, means connecting said steering shaft with one of said clutch members whereby the latter may be turned, springs for moving the moving clutch members into engagement with the associated clutch members, two levers which are respectively associated with the movable clutch members for moving them in opposition to their springs out of engagement with the associated clutch members, a rocker mounted on the front end of the implement frame, trains of mechanism which respectively connect said two levers with said rocker, and means operable from the driver's seat on the tractor for rocking said rocker.

In testimony whereof, I hereunto affix my signature.

GEORGE DOUGLAS JONES.